(12) United States Patent
Grase et al.

(10) Patent No.: US 8,870,547 B2
(45) Date of Patent: Oct. 28, 2014

(54) STRUCTURAL ELEMENT FOR AN AIRCRAFT AND SPACECRAFT AND METHOD FOR PRODUCING A STRUCTURAL ELEMENT OF THIS TYPE

(75) Inventors: Karim Grase, Hamburg (DE); Ichwan Zuardy, Hamburg (DE); Marianne Jacoba Reijerkerk, Oberschleissheim (DE)

(73) Assignee: Airbur Operations GmbH, Hamburg (DE)

( * ) Notice: Subject to any disclaimer, the term of this patent is extended or adjusted under 35 U.S.C. 154(b) by 608 days.

(21) Appl. No.: 13/208,861

(22) Filed: Aug. 12, 2011

(65) Prior Publication Data

US 2012/0051937 A1    Mar. 1, 2012

Related U.S. Application Data

(60) Provisional application No. 61/376,506, filed on Aug. 24, 2010.

(30) Foreign Application Priority Data

Aug. 24, 2010 (DE) .......................... 10 2010 039 705

(51) Int. Cl.
  *B64C 11/20* (2006.01)
  *B64C 3/18* (2006.01)
  *B64C 1/06* (2006.01)

(52) U.S. Cl.
  CPC ... *B64C 1/06* (2013.01); *B64C 3/18* (2013.01); *Y02E 10/721* (2013.01); *Y10S 416/50* (2013.01)
  USPC ............................. 416/226; 416/230; 416/500

(58) Field of Classification Search
  CPC ...... B64C 3/185; B64C 11/18; B64C 27/467; B64C 27/51

USPC .............................. 416/23, 24, 226, 230, 500
See application file for complete search history.

(56) References Cited

U.S. PATENT DOCUMENTS

| | | | |
|---|---|---|---|
| 2,503,450 A | | 3/1945 | Nebesar |
| 4,136,846 A | * | 1/1979 | Brault ........................ 244/123.6 |

(Continued)

FOREIGN PATENT DOCUMENTS

| | | |
|---|---|---|
| CH | 217688 | 2/1942 |
| CN | 101357516 | 2/2009 |

(Continued)

OTHER PUBLICATIONS

German Office Action for Application No. 10 2010 039 705.9 dated Jul. 10, 2013.

(Continued)

*Primary Examiner* — Ninh H Nguyen
(74) *Attorney, Agent, or Firm* — Jenkins, Wilson, Taylor & Hunt, P.A.

(57) ABSTRACT

The present invention provides a structural element, in particular for an aircraft and spacecraft, comprising a core, the rigidity of which varies at least in portions for optimising the aeroelastic characteristics of the structural element The present invention also provides a method for producing a structural element, in particular for an aircraft and spacecraft, which comprises the following steps: provision of a structural element comprising a core; determination of the aeroelastic behavior of the structural element; and variation, at least in portions, of the rigidity of the core of the structural element such that the aeroelastic behavior of the structural element is optimised. The present invention further provides an aircraft and spacecraft comprising a structural element of this type, and a rotor blade, in particular for a wind turbine, comprising a structural element of this type.

14 Claims, 8 Drawing Sheets

(56) References Cited

U.S. PATENT DOCUMENTS

| | | | |
|---|---|---|---|
| 4,293,276 A * | 10/1981 | Brogdon et al. | 416/134 A |
| 4,345,876 A * | 8/1982 | Schwarz et al. | 416/134 A |
| 4,662,587 A | 5/1987 | Whitener | |
| 5,958,550 A | 9/1999 | Childress | |
| 5,973,440 A | 10/1999 | Nitzsche et al. | |
| 7,364,407 B2 * | 4/2008 | Grabau et al. | 416/229 R |
| 8,192,169 B2 * | 6/2012 | Piasecki | 416/226 |
| 2009/0277996 A1 * | 11/2009 | Rinaldi et al. | 244/123.1 |
| 2012/0020801 A1 | 1/2012 | Zuardy | |

FOREIGN PATENT DOCUMENTS

| | | |
|---|---|---|
| CN | 101378956 | 3/2009 |
| DE | 38 21 588 | 2/1998 |
| DE | 39 11 691 | 10/1998 |
| DE | 698 05 302 T2 | 11/2002 |
| DE | 10 2010 038 408 | 1/2012 |
| EP | 2 256 034 | 12/2010 |
| FR | 2748719 | 11/1997 |
| GB | 1097481 | 1/1968 |
| WO | WO 9902398 | 1/1999 |

OTHER PUBLICATIONS

Chinese Office Action for Application No. 201110253600.5 dated Oct. 31, 2013.

* cited by examiner

STRUCTURAL ELEMENT FOR AN AIRCRAFT AND SPACECRAFT AND METHOD FOR PRODUCING A STRUCTURAL ELEMENT OF THIS TYPE

CROSS-REFERENCE TO RELATED APPLICATIONS

This application claims the benefit of U.S. Provisional Application No. 61/376,506, filed Aug. 24, 2010 and German patent application No. 10 2010 039 705.9, filed Aug. 24, 2010, the entire enclosures of which are herein incorporated by reference.

FIELD OF THE INVENTION

The present invention relates to a structural element, in particular for an aircraft and spacecraft, to a method for producing a structural element of this type, to an aircraft and spacecraft comprising a structural element of this type and to a rotor blade comprising a structural element of this type.

BACKGROUND OF THE INVENTION

The interaction between a structural element, for example of an aircraft and spacecraft, and an air flow is known as aeroelastics and the behaviour of the structural element in the air flow is known as the aeroelastic behaviour of the structural element. The aeroelastic behaviour of the structural element, in particular a mode shape of the structural element, is determined, inter alia, by the rigidity of the structural element. The term "mode shape" is understood as meaning the shape of the structural element assumed by the structural element under a vibration load, for example. The structural element is not only subjected to structural-dynamic effects but also to elastic deformations as a result of air flows. The elastic deformations are a result of the structural-dynamic characteristics as well as of the aeroelastic characteristics of the structural element and can lead, for example, to undesirable vibrations of the structural element. In turn, this can cause an increased generation of noise, a partial loss of function of the structural element, such as in the case of fluttering of a control surface, or can even cause the structural element to rupture or disintegrate.

The Applicant is familiar operationally with various procedures for influencing the aeroelastic characteristics of the structural element. Additional masses are often attached to an affected structural element, as a result of which it is possible to influence the natural vibration frequencies of the structural element, for example. Although this procedure produces good results in respect of the vibration behaviour of the structural element, it is a disadvantage that unnecessary masses, i.e. so-called dead or unsupporting masses have to be moved during operation of the aircraft and spacecraft. This leads, inter alia, to the disadvantage of increased fuel consumption due to the excess weight.

Alternatively, it is possible to adapt the rigidity by adapting shapes of the affected structures or, in the case of fibre composite construction methods, by appropriately varying the fibre orientations and layer structure. However, it has been found that a disadvantage of this procedure is that the shape, which is optimised in respect of lightweight construction, strength and aerodynamic behaviour, of the structural element has to be changed. Changing the fibre direction orientation and/or the layer structure also means a change which is undesirable in respect of the achievable mechanical characteristics and an increased expense in adapting the corresponding component shapes.

Furthermore, it is possible to vary the materials which are used. For example, materials which have different rigidity and/or strength characteristics can be incorporated into a structural element. However, this greatly increases the production costs and outlay.

It is also possible to use passive or active damper elements. However, the use of damper elements means an increase in the number of components of the structural element. This presents the disadvantage of additional weight and furthermore adversely increases the complexity of the structural element.

DE 698 05 302 T2 describes, for example, a structural element for an aircraft and spacecraft, the rigidity of which can be actively changed. For this purpose, an effective cross section of the structural element and thus the rigidity thereof is changed by means of a piezoelement integrated into the structural element. The piezoelement arranged in a recess in the structural element is moved from an unexpanded state into an expanded state, the piezoelement only resting against two opposing walls of the recess in the expanded state and thus transferring forces from one wall to the other. This measure changes the rigidity of the structural element and the aeroelastic characteristics thereof can thus be actively influenced. However, this approach to solving the problem requires the use of additional components which also unfavourably involve an increase in the complexity and probability of failure of the structural element in addition to an extra weight.

SUMMARY OF THE INVENTION

It is therefore an object of the present invention to provide an improved structural element, in particular for an aircraft and spacecraft, which overcomes the above-mentioned disadvantages.

This object is achieved by a structural element which has the features of claim 1 and/or by a method which has the features of claim 12.

Accordingly, a structural element, in particular for an aircraft and spacecraft, is provided which comprises a core, the rigidity of which varies at least in portions to optimise the aeroelastic characteristics of the structural element.

Furthermore, a method for producing a structural element, in particular for an aircraft and spacecraft, is provided which has the following steps: provision of a structural element comprising a core; determination of the aeroelastic behaviour of the structural element; and variation, at least in portions, of the rigidity of the core of the structural element such that the aeroelastic behaviour of the structural element is optimised.

The idea on which the present invention is based is to vary the rigidity of the core of the structural element at least in portions. Consequently, it is possible to obtain for example regions inside the core which have an increased or reduced rigidity, thereby achieving anisotropy of the structural element. It is possible to influence the aeroelastic characteristics of the structural element by varying in portions the rigidity of the core.

Thus, compared to problem-solving approaches which have already been described, it is unnecessary to use additional weights or to make changes to the shape, the fibre orientation and/or the fibre layer structure of the structural element and/or to use additional components in the form of damper elements.

Advantageous configurations and developments of the present invention are provided in the subclaims and in the description combined with the figures of the drawings.

According to a preferred development of the structural element, said structural element has a sandwich structure with a cover layer which surrounds the core at least in portions, in particular a cover layer formed from carbon fibres. The cover layer advantageously makes it possible to achieve a high rigidity and the desired mechanical characteristics of the structural element. It also advantageously allows loads to be introduced into the structural element.

According to a further preferred development of the structural element, the core has an integrated reinforcement for the variation in portions of the rigidity. Consequently, it is possible to exactly adjust the rigidity of the core by means of the integrated reinforcement and to adapt it to requirements.

According to a further preferred development of the structural element, the reinforcement couples together mutually opposing cover surfaces of the cover layer of the structural element. Consequently, the rigidity of the structural element is increased in portions, as a result of which it is possible to advantageously influence a mode shape of the structural element.

According to a further preferred development of the structural element, the integrated reinforcement and the cover layer are configured monolithically. This allows an optimum transmission of force from the reinforcement to the cover layer and vice versa.

According to a further preferred development of the structural element, the integrated reinforcement comprises a reinforcement pin, as a result of which an extensive reinforcement of the core is advantageously realised. Consequently, a rigidity modulus of the core, for example, is increased.

According to a further preferred development of the structural element, the reinforcement pin is arranged at an inclination angle and in an inclination direction to at least one of the cover surfaces. The variation in portions of the rigidity of the core can be adjusted within wide ranges by varying the inclination angle and the inclination direction of the reinforcement pin.

According to a further preferred development of the structural element, the integrated reinforcement comprises a large number of reinforcement pins which have in particular differing inclination angles and/or differing inclination directions. This makes it possible to adjust the rigidity of the core in a flexible manner.

According to a further preferred development of the structural element, the integrated reinforcement comprises a reinforcement profiled part, thereby realising a linear reinforcement of the core. Consequently, for example a torsional deformation of the structural element under a flexural load is possible. This advantageously allows the mode shape of the structural element to be influenced.

According to a further preferred development of the structural element, the reinforcement profiled part is configured as a double T-profiled part, a T-profiled part, an I-profiled part, a C-profiled part, a Z-profiled part, a round profiled part, a box profiled part or the like. Consequently, it is advantageously possible to use standard semi-finished products to produce the integrated reinforcement, thereby reducing the production costs of the structural element.

According to a further preferred development of the structural element, a material density of the core varies at least in portions for optimising the natural vibration behaviour of the structural element, the core having in particular core segments of a differing material density. Consequently, it is possible to advantageously vary the natural vibration behaviour of the structural element.

According to a further preferred development of the method, the aeroelastic behaviour of the structural element is determined by means of simulation or a vibration test. This allows a simple and convenient variation of the rigidity of the core, thereby simplifying the method for producing the structural element.

BRIEF DESCRIPTION OF THE DRAWINGS

In the following, the invention will be described in more detail on the basis of embodiments with reference to the accompanying figures of the drawings, in which.

In the figures, like reference numerals denote like or functionally identical components, unless indicated otherwise.

DETAILED DESCRIPTION OF THE INVENTION

Figure 1:
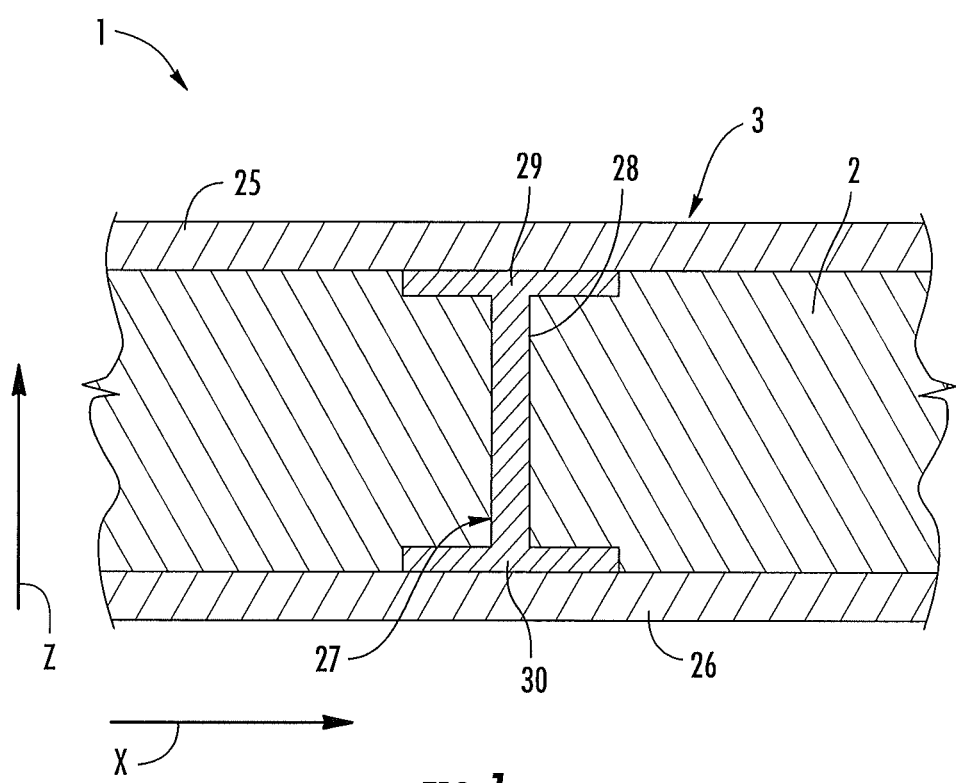
FIG. 1 is a partial sectional view of a preferred embodiment of a structural element.
Figure 2:
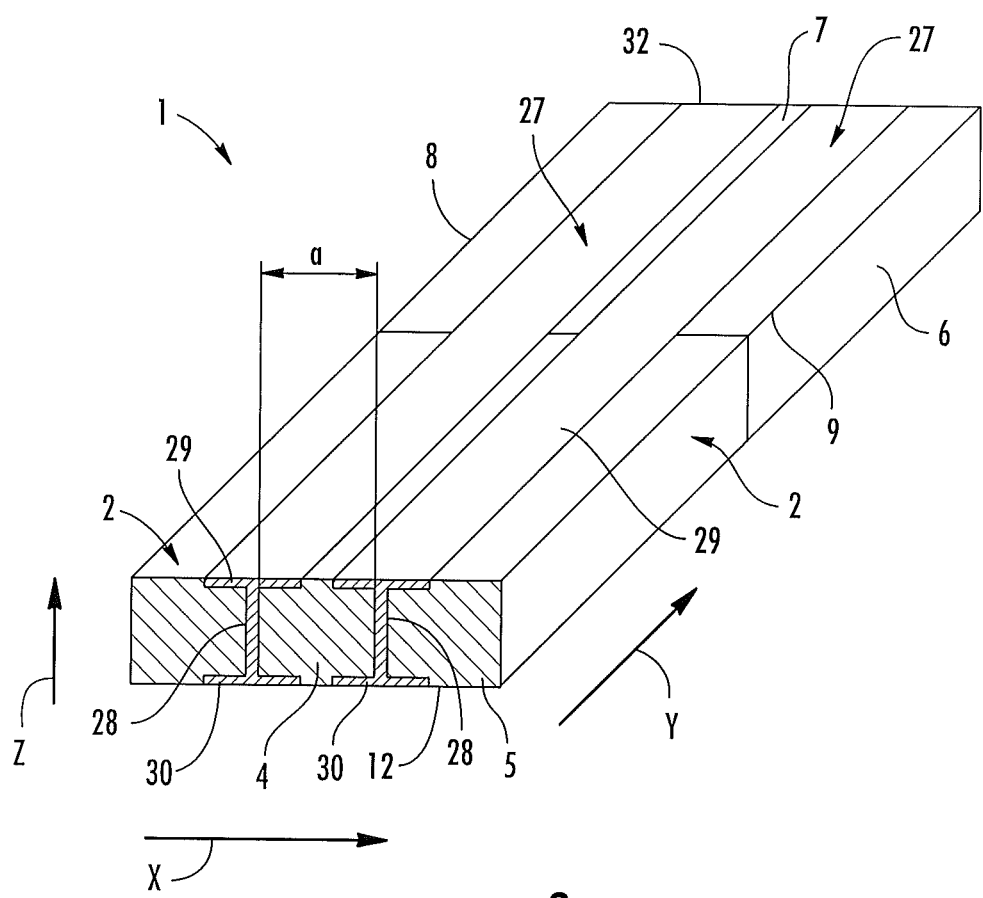
FIG. 2 is a perspective view of the structural element according to FIG. 1.

FIGS. 1 and 2, to which reference will simultaneously be made in the following, illustrate in a partial sectional view and in a perspective view a preferred embodiment of a structural element 1, in particular for an aircraft and spacecraft. The structural element 1 is configured, for example as an aerodynamic effective surface or as a fuselage element of an aircraft and spacecraft. The structural element 1 preferably has a sandwich structure with a core 2 and a cover layer 3 surrounding at least portions of the core 2. The cover layer 3 preferably completely surrounds the core 2. The cover layer 3 is formed, for example from a fibre-reinforced plastics material, in particular from a carbon fibre-reinforced plastics material. The cover layer 3 preferably has a large number of laminate layers consisting of the fibre-reinforced plastics material. Fibre orientations and fibre paths of the fibre-reinforced plastics material are thus adapted to the loads which act on the structural element 1. The cover layer 3 can be anisotropic in the fibre orientation of the reinforced plastics material. The cover layer 3 is preferably of a small thickness of fractions of a millimeter up to a few millimeters. The cover layer 3 ensures the necessary mechanical stability and rigidity of the structural element 1. For example, the cover layer 3 serves to introduce loads into the structural element 1. The cover layer 3 forms, for example, an aerodynamic surface of the structural element 1. The cover layer 3 has, for example, a first cover skin 25, in particular an upper cover skin 25 and a second cover skin 26, in particular a lower cover skin 26.

The core 2 is configured, for example as a foam core 2. To provide a clearer view, the structural element is shown in FIG. 2 without the cover layer 3. For example, the foam core 2 is configured as a closed-cell foam core 2 formed using a plastics material, in particular polymethacrylimide. The core material is characterised, for example, by means of a so-called volume weight or a so-called material density of the foam material used for the core 2. The volume weight is preferably defined as mass per volume unit, for example as kg/m³. Accordingly, a foam material with a high volume weight has a higher mass fraction and/or volume fraction of plastics material than a foam material with a low volume weight per volume unit. Alternatively, any other plastics materials, metal foams, such as aluminium or titanium foams, or a combination of plastics material foam and metal foam can be used for the core 2. The core 2 preferably has a large number of core segments, of which only core segments 4-7 have been provided with a reference numeral. The core segments 4-7 have, for example, a differing material density It is also possible for the core segments 4-7 to all have the same material density. There can be any number of core segments 4-7 which can be of any shape. The core 2 can be segmented in any desired manner in a transverse direction x, in a longitudinal direction y and/or in a vertical direction z of the structural element 1. The core 2 can also be constructed homogeneously, i.e. without being segmented.

In an alternative embodiment of the structural element 1, the core 2 is configured, for example, as a solid core 2. For example as a plastics material core 2, in particular as a solid plastics material core 2, preferably with the core segments 4-7 which can be formed with plastics materials of a differing density. Monolithic metal materials, for example aluminium or titanium alloys, can also be used as the material for the solid core 2 or for the segments 4-7 of the core. Furthermore, the core 2 can also be configured as a wooden core 2, in particular as a solid wooden core 2. The wooden core 2 preferably has any desired number of core segments 4-7 which are preferably formed from wooden materials of a differing volume weight, such as poplar or oak. In a further embodiment of the structural element 1, the core 2 is configured as a so-called honeycomb core 2, in particular as a folded honeycomb core 2 or the like. The honeycomb core 2 has, for example, core segments 4-7 with differing cell densities of the honeycombs. Furthermore, the core 2 can be formed from a so-called woven spacer fabric or knit spacer fabric. The core 2 is also configured, for example, as a tubular core 2 or as a core 2 with nap honeycombs. Alternatively, the core 2 or segments 4-7 of the core 2 can be configured, for example as a so-called profiled core 2 ("corrugated core"). The core 2 can also be configured as a ceramics core 2. Individual core segments 4-7 of the core 2 can be formed from a ceramics material. The core 2 can also be configured as a so-called flying production model 2, i.e. the core 2 is ultimately only required for the production of the structural element 1 and does not have a supporting function. For example in this case, after the structural element 1 has been produced, the core 2 can be removed therefrom, in particular detached therefrom. In the following, an interior 2 or cavity 2, surrounded by the cover layer 3, in particular by the cover skins 25, 26, of the structural element 1 will also be called a core 2. In other words, the interior 2, surrounded by the cover layer 3, in particular by the cover skins 25, 26, of the structural element 1 is also understood as meaning the core 2 or individual segments 4-7 of the core 2 of the structural element 1. In particular, the core 2 can be configured as a combination of the aforementioned core forms and core materials and/or any desired core forms and core materials, for example as a combination core 2. The combination core 2 comprises, for example, foam material, solid plastics material/wooden material and/or honeycomb material or the like.

To optimise the natural vibration behaviour of the structural element 1, the material density or the volume weight of the core 2 varies at least in portions. For example, a structural component, vibrating at its natural frequency, of an aircraft and spacecraft can also stimulate an adjacent structural component to vibrate. The adjacent and intercoupled structural components stimulate one another, which can lead to undesirable deformations of the structural components and which, at worst, can result in inoperability of the structural components. By means of the variation at least in portions of the material density of the core 2 according to the present invention, the natural vibration frequency of the structural element 1 is changed such that a mutual stimulation of this type of a plurality of structural elements 1 is prevented. By means of the varying material density of the core 2, a mass distribution within the structural element 1 is configured such that, for example, a natural vibration frequency of the structural element 1 is reduced. The material density of the core 2 varies, for example in the transverse direction x, in the longitudinal direction y and/or in the vertical direction z of the structural element 1. The varying material density of the core 2 is preferably achieved in that the core 2 has the core segments 4-7, said core segments 4-7 preferably having differing material densities or volume weights. The core segments 4-7 can segment the core 2 for example in the transverse direction x, in the longitudinal direction y and/or in the vertical direction z of the structural element 1. The core segments 4-7 are preferably arranged such that as a result of the mass distribution in the core 2, a natural vibration frequency of the structural element 1 is changed, for example reduced, in a predetermined manner. For example, a lower natural vibration frequency is achieved by the arrangement of the core segments 4-7 compared to a homogeneous core. Each core segment 4-7 preferably has a respective homogeneous material density or volume weight. For example, the material density of the core 2 continuously increases or decreases from a leading edge 8, for example a leading edge 8 of the structural element, to a trailing edge 9, for example a trailing edge 9 of the structural element 1. Alternatively or additionally, the material density of the core 2 can increase or decrease, for example from a root 12 of a structural element to a tip 32 of a structural element, for example a wing tip 32 of the structural element 1. An increased or reduced material density of the structural element, 1 can also be provided centrally, on the lower side and/or on the upper side of the structural element 1. The core segments 4-7 are produced, for example by a CNC processing machine according to requirements from semi-finished foam products.

The structural element 1 preferably also has an integrated reinforcement 27, for example a linear reinforcement 27. The integrated reinforcement 27 is preferably integrated into the core 2. For example, the integrated reinforcement 27 is arranged between the core segments 4-7. The integrated reinforcement 27 preferably couples together the opposing cover skins 25, 26 of the cover layer 3 of the structural element 1. The reinforcement 27 and the cover layer 3 are preferably configured monolithically. The reinforcement 27 is preferably formed from the same material as the cover layer 3. For example, the integrated reinforcement 27 is formed by a carbon fibre-reinforced plastics material. The core 2 preferably has a large number of integrated reinforcements 27. The integrated reinforcement 27 is configured, for example, as a reinforcement profiled part 27 or it comprises a reinforcement profiled part 27. The reinforcement profiled part 27 is configured, for example as a double T-profiled part, a T-profiled part, an I-profiled part, a Z-profiled part, a round profiled part, a box profiled part or the like. The core 2 can comprise reinforcement profiled parts 27 with differing cross-sectional shapes. The reinforcement profiled part 27 can be arranged, for example between segments 4-7 of the core 2 or for example can surround at least portions of one of the segments 4-7. For example, the reinforcement profiled part 27 can be configured as a box profiled part 27, one of the core segments 4-7 being arranged in the box profiled part 27.

According to FIGS. 1 and 2, the reinforcement profiled part 27 is configured, for example, as a double T-profiled part 27 with a flange 29 associated with the cover skin 25, a flange 30 associated with the cover skin 26 and a web 28 connecting the flanges 29, 30. The flanges 29, 30 are preferably joined monolithically to the cover skins 25, 26. The core 2 preferably has a large number of integrated reinforcement profiled parts 27 which can run in any desired manner in the transverse direction x, in the longitudinal direction y and/or in the vertical direction z. Depending on its orientation in the core 2, the reinforcement profiled part 27 absorbs flexural loads and/or torsional loads. The reinforcement profiled part 27 is used for the variation in portions of the rigidity of the core 2 to optimise the aeroelastic characteristics of the structural element 1. The rigidity of the core 2 is adjustable for example by means of the type of fibre which is used for the reinforcement profiled part 27, the thickness of the web 28 and/or of the flanges 29, 30, the distance a or pitch distance a between two reinforcement profiled parts 27, in particular between two webs 28 of two reinforcement profiled parts 27, and/or the orientation of the reinforcement profiled part 27 in the x, y and/or z direction inside the core 2. For example, the reinforcement profiled part 27 shown on the left-hand side in FIG. 2 runs parallel to the leading edge 8 of the structural element 1, whereas the reinforcement profiled part 27 shown on the right-hand side runs at an angle to the leading edge. The reinforcement profiled part 27 running parallel to the leading edge 8 substantially influences the flexural strength of the structural element 1, for example when a load acts on the tip 32 of the structural element. When the reinforcement profiled part 27 runs obliquely, for example in the longitudinal direction y and in the transverse direction x, the flexural strength and the torsional strength of the structural element 1 are both changed. The variation at least in portions of the rigidity of the core 2 optimises the aeroelastic characteristics of the structural element 1, without requiring a variation in the laminate structure of the cover layer 3. For example, when a load is applied to the tip 32 of the structural element, the reinforcement profiled part 27 running obliquely in the core 2 and shown on the right-hand side in FIG. 2 will produce a twisting of the structural element 2. For example, by means of a suitable arrangement of the reinforcement profiled parts 27, it is thus possible to purposefully influence the mode shape or eigenmode of the structural element 1 under a load, for example under an aerodynamic load. If the structural element 1 is configured as an aerofoil of an aircraft and spacecraft for example, it can be used to twist the leading edge 8 downwards in the direction of a pressure side of the aerofoil when the tip 32 of the structural element is subjected to a load. This is known as "nose down". This reliably prevents the leading edge 8 from twisting upwards. If the leading edge 8 twists up in an undesirable manner, air would flow against the pressure side or lower side of an aerofoil, meaning that the leading edge 8 would twist up even further. This self-reinforcing effect could result in disintegration of the aerofoil. However, this is prevented by the structural element 1 according to the present embodiment. The variation in portions of the rigidity of the core 2 advantageously produces an anisotropy, in particular a rigidity anisotropy, of the structural element 1.

To produce the structural element 1, the reinforcement profiled part 27 or a large number of reinforcement profiled parts 27 are placed, for example between the core segments 4-7 which can have a variable or homogeneous material density and the core segments 4-7 are then covered by the cover layer 3. The cover layer 3 and the reinforcement profiled part 27 are impregnated in a moulding tool, for example with a matrix material. This measure can be carried out, for example by a resin infusion process. After the matrix material has cured, the structural element 1 can be removed from the mould. Alternatively, the reinforcement profiled part 27 can be used in an already pre-cured form, for example.

Figure 3:
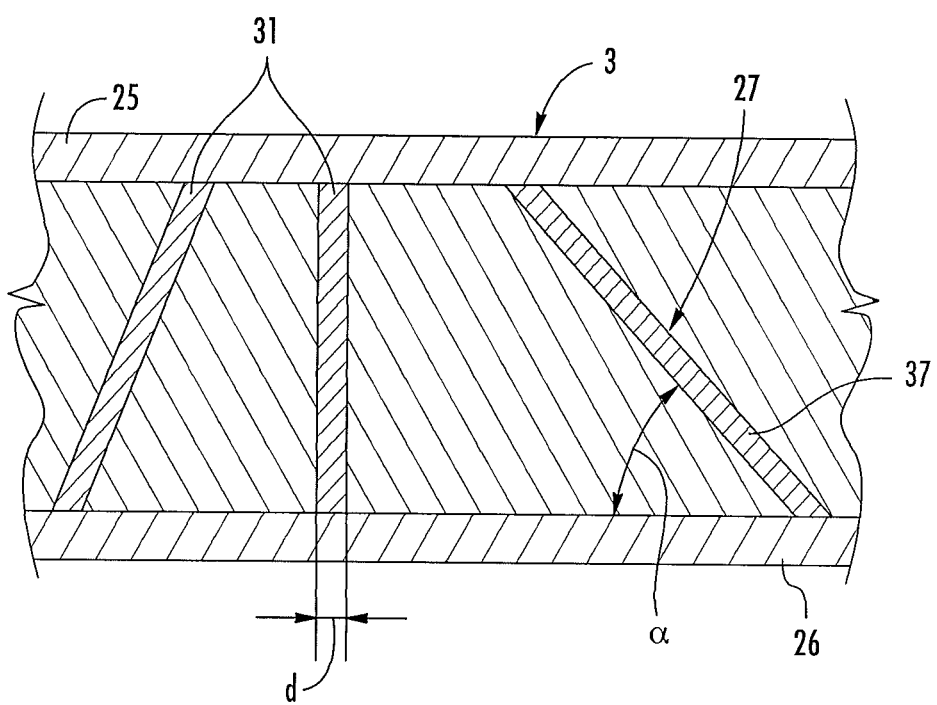
FIG. 3 is a partial sectional view of a further preferred embodiment of a structural element.
Figure 4A:
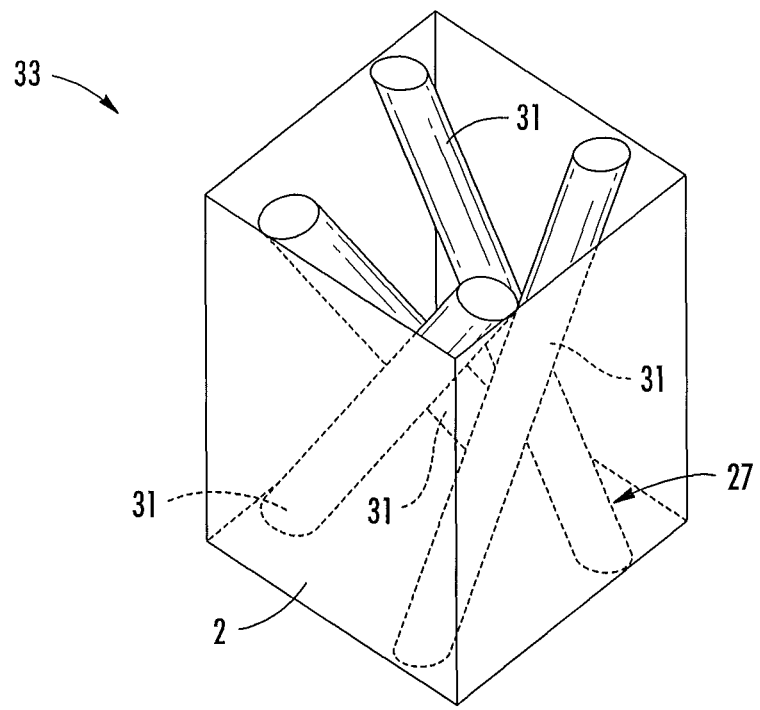
FIG. 4A is a perspective view of the structural element according to FIG. 3.
Figure 4B:
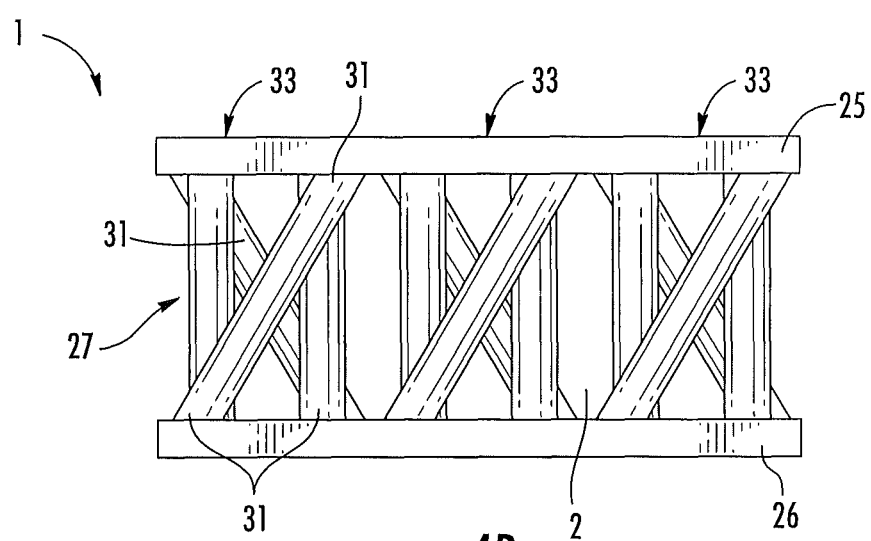
FIG. 4B is a side view of the structural element according to FIG. 3.

FIGS. 3, 4A and 4B, to which reference will simultaneously be made in the following, illustrate in a partial sectional view, a perspective view and a side view a further preferred embodiment of a structural element 1. The structural element 1 according to FIGS. 3, 4A and 4B differs from the embodiment of the structural element 1 according to FIGS. 1 and 2 merely in the configuration of the integrated reinforcement 27. The integrated reinforcement 27 is configured as a two-dimensional reinforcement 27. In this respect, the integrated reinforcement 27 has a reinforcement pin 31, preferably a large number of reinforcement pins 31. The core 2 can have one integrated reinforcement 27 or a large number of integrated reinforcements 27 with in each case one or in each case a large number of reinforcement pins 31. The reinforcement pin 31 or pin 31 is preferably formed from a fibre-reinforced plastics material, in particular from a carbon fibre-reinforced plastics material. For example, the pin 31 is formed from the same material as the cover layer 3. The pin 31 has, for example a circular, oval, strip-shaped, rectangular, polygonal or any desired cross section. The core 2 can have pins 31 with different cross-sectional shapes. A pin 31 preferably couples together the mutually opposing cover skins 25, 26 of the cover layer 3. The integrated reinforcement 27, in particular the pin 31 or the large number of pins 31 is preferably configured monolithically with the cover layer 3. The pin is arranged at an inclination angle $\alpha$ and in an inclination direction to at least one of the cover skins 25, 26. The pin 31 can also stand vertically on the cover skins 25, 26 or on one cover skin 25, 26. The pin 31 preferably penetrates the core 2 or one of the core segments 4-7. A unit cell 33 of the structural element 1 which is illustrated in FIG. 4A without the cover skins 25, 26 preferably has a large number of reinforcement pins 31 which preferably have differing inclination angle $\alpha$ and/or differing inclination directions. To vary the rigidity of the core 2 in portions, it is possible to adjust, for example, the type of fibre of the pin 31, a diameter d, the cross-sectional shape, the inclination angle $\alpha$, the distance between the pins 31, the number of pins 31 per unit cell 33 and/or the inclination direction. The pins 31 can be in a regular or irregular arrangement and/or orientation in the unit cell 33. FIG. 4B is a side view of a portion of the structural element with three unit cells 33, for example with in each case four reinforcement pins 31. There can be any desired number of reinforcement pins 31 per unit cell 33. The pins 31 substantially increase the shear strength of the core 2. The structural element 1 can have a core 2 which comprises reinforcement profiled parts 27 as well as reinforcement pins 31.

To produce the structural element 1, the pins 31 are inserted, for example into the core 2 or into segments 4-7 of the core 2 and they are then covered with the cover layer 3. After the cover layer 3 and the pins 31 have been impregnated with a resin matrix, the structural element 1 is cured and removed from the mould. Impregnation takes place, for example, in a resin infusion process. If the core 2 does not perform a function during operation of the structural element 1, it can be removed, for example after the matrix material has cured.

Figure 5:
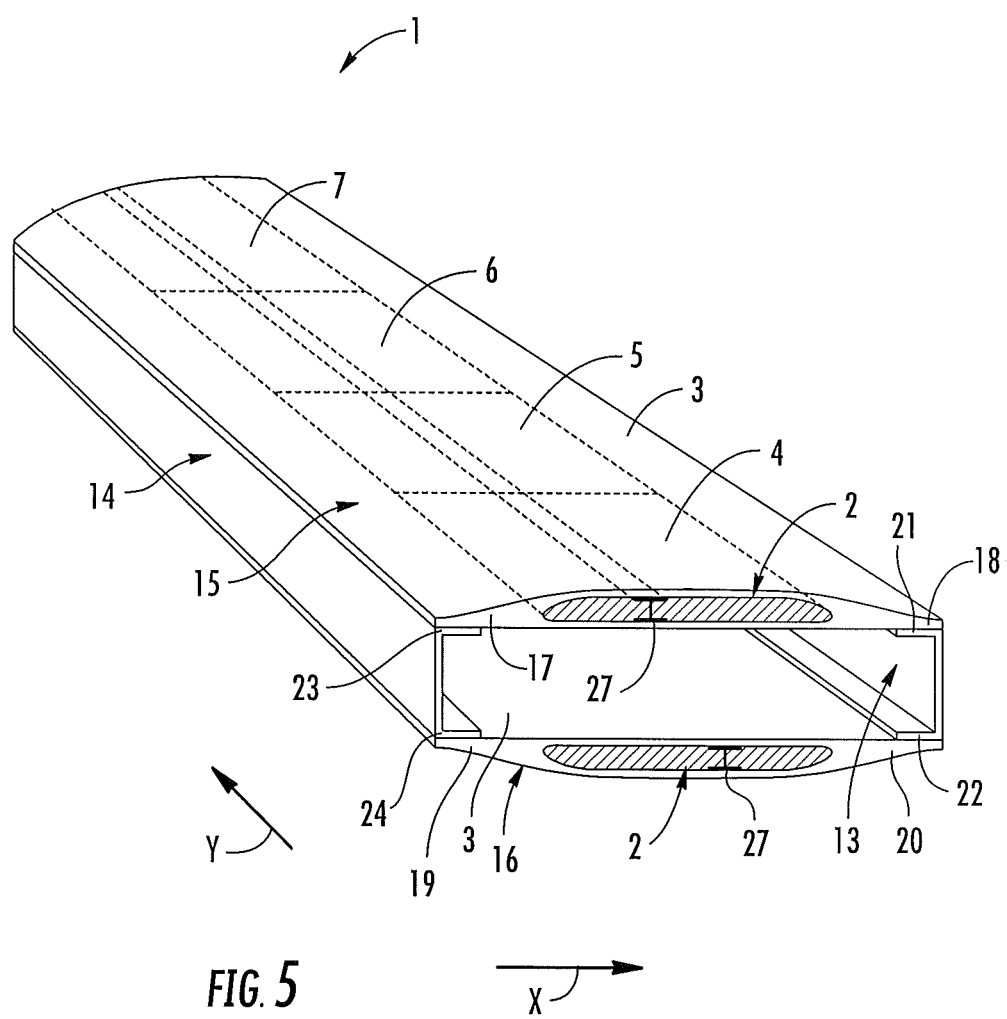
FIG. 5 is a perspective view of a further preferred embodiment of the structural element.

FIG. 5 illustrates a further preferred embodiment of a structural element 1. The structural element 1 is configured, for example, as a spar box 1 or as a flexural-torsional box 1. The spar box 1 forms, for example, a tail surface 1, a wing box 1 or a tail unit 1, for example a horizontal tail plane 1, a rudder unit 1, a landing flap 1 or the like, of an aircraft and spacecraft. In this embodiment, the structural element has, for example, two spars 13, 14 which are spaced apart from one another in the transverse direction x and extend in the longitudinal direction y of the structural element 1. The spars 13, 14 are preferably formed from a fibre-reinforced plastics material, in particular from a carbon fibre-reinforced plastics material. For example, the spars 13, 14 are formed from the same material as the cover layer 3 of the structural element 1. The spars 13, 14 have an approximately U-shaped cross section, planking elements 15, 16 of the structural element 1 preferably resting in each case on side limbs 21-24 of the respective U-shape. The structural element 1 has, for example, an upper planking element 15 and a lower planking element 16. In the present embodiment, the structural element 1 has two cores 2, one core 2 being associated with each planking element 15, 16. The cores 2 are preferably configured with integrated reinforcements 27 for varying in portions the rigidity of the cores 2 according to the embodiments of the structural element 1 of FIG. 1 to 4. By way of example, FIG. 5 shows in each core 2 a double T-profiled part 27, extending in the longitudinal direction y and indicated in dashed lines, as an integrated reinforcement 27. The cores 2 are preferably segmented in any desired manner and only have, for example, the segments 4-7 (shown in dashed lines). The double T-profiled part 27 extends through the segments 4-7, for example. The cores 2 are surrounded at least in portions in each case by the cover layer 3 which is preferably formed from a carbon fibre-reinforced plastics material and is joined monolithically to the integrated reinforcement 27. The cover layer 3 preferably completely surrounds a respective core 2. The planking elements 15, 16 are joined for example to the spars 13, 14 in peripheral regions 17-20 of the planking elements 15, 16, which peripheral regions 17-20 are associated with the spars 13,14 and extend in the longitudinal direction Y of the structural element 1. The spars 13, 14 and the planking elements 15, 16 are joined together, for example, by riveting or adhesive bonding. Said adhesive bonding procedure can be carried out, for example, by a so-called co-bonding process. In this process, for example, the uncured planking elements 15, 16 are joined to the spars 13, 14 which have already cured, in a wet on hard manner. The respective core 2 preferably does not extend into the respective peripheral region 17-20. This means that the peripheral regions 17-20 and the side limbs 21-24 of the spars 13, 14 preferably form in each case monolithic connection regions. The monolithic connection regions are preferably configured as monolithic carbon fibre-reinforced connection regions. These consist only of carbon fibre-reinforced plastics material. The variation in portions of the rigidity of the core 2 preferably results in an anisotropy, in particular in a rigidity anisotropy of the planking elements 15, 16 and of the structural element 1. The embodiment of the structural element 1 according to FIG. 5 is preferably used in large aircraft, such as passenger aircraft.

Figure 6:
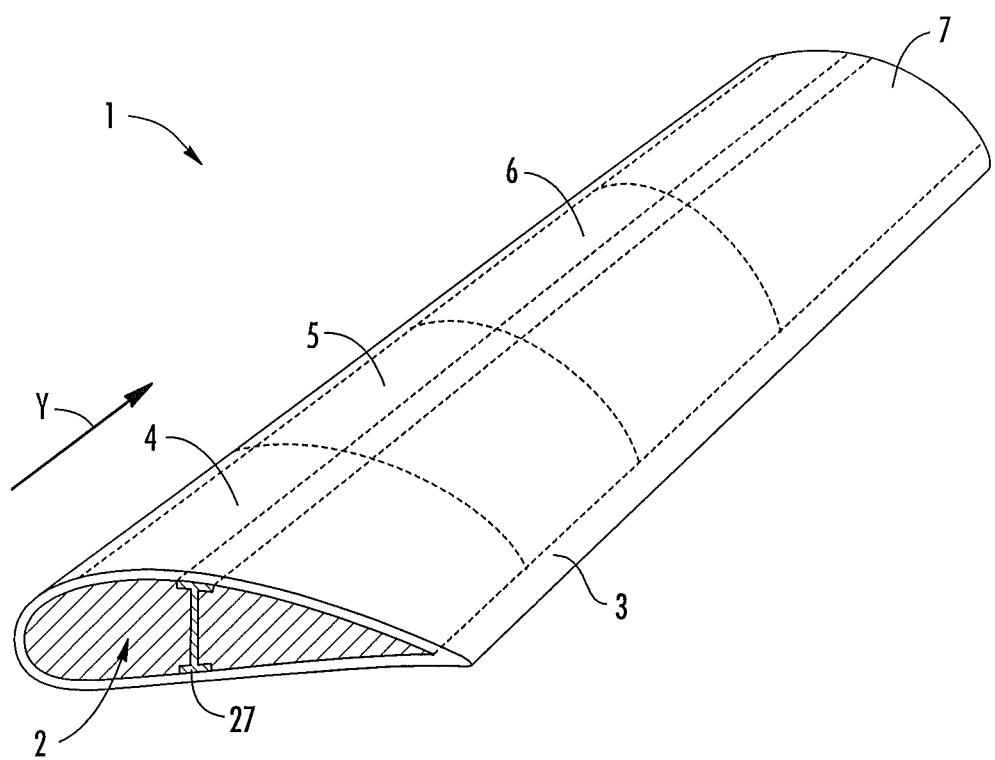
FIG. 6 is a perspective view of a further preferred embodiment of the structural element.

FIG. 6 illustrates a further preferred embodiment of a structural element 1. The structural element 1 is configured, for example, as an aerofoil 1 of a glider, as a propeller blade 1, a rotor blade 1 of a helicopter or as a wind turbine blade 1 or rotor blade 1 of a wind turbine. The structural element 1 is constructed by a solid foam sandwich method, the core 2 preferably completely filling an inner region of the structural element 1. An outer contour of the core 2 can approximately correspond to an outer contour of the structural element 1. It is also possible for the core 2 to only fill portions of the inner region of the structural element 1, for example, in which case the cover layer 3 preferably does not contact the complete surface of the core 2, but for example only contacts part of the core surface, or contacts it in a linear and/or punctiform manner. The core 2 is preferably configured with an integrated reinforcement 27 for varying portions of the rigidity of the core 2 according to the embodiments of the structural element 1 according to FIG. 1 to 4. By way of example, FIG. 6 illustrates a double T-profiled part 27 which extends in the longitudinal direction y (shown in dashed lines), as an integrated reinforcement 27 in the core 2. The core 2 is preferably segmented in any desired manner and only has, for example, the segments 4-7 (shown in dashed lines). The double T-profiled part 27 extends, for example, though the segments 4-7. The cover layer 3 preferably completely surrounds the core 2. The cover layer 3 forms an outer skin of the structural element 1, in particular an aerodynamic surface of the structural element 1. The cover layer 3 is preferably formed from a carbon fibre-reinforced plastics material. In particular, the cover layer 3 is joined monolithically to the integrated reinforcement 27. The embodiment of the structural element 1 according to FIG. 6 can be used, for example, in small aircraft. This method of construction can preferably also be used in propeller blades 1, rotor blades 1 or wind turbine blades 1.

Figure 7:
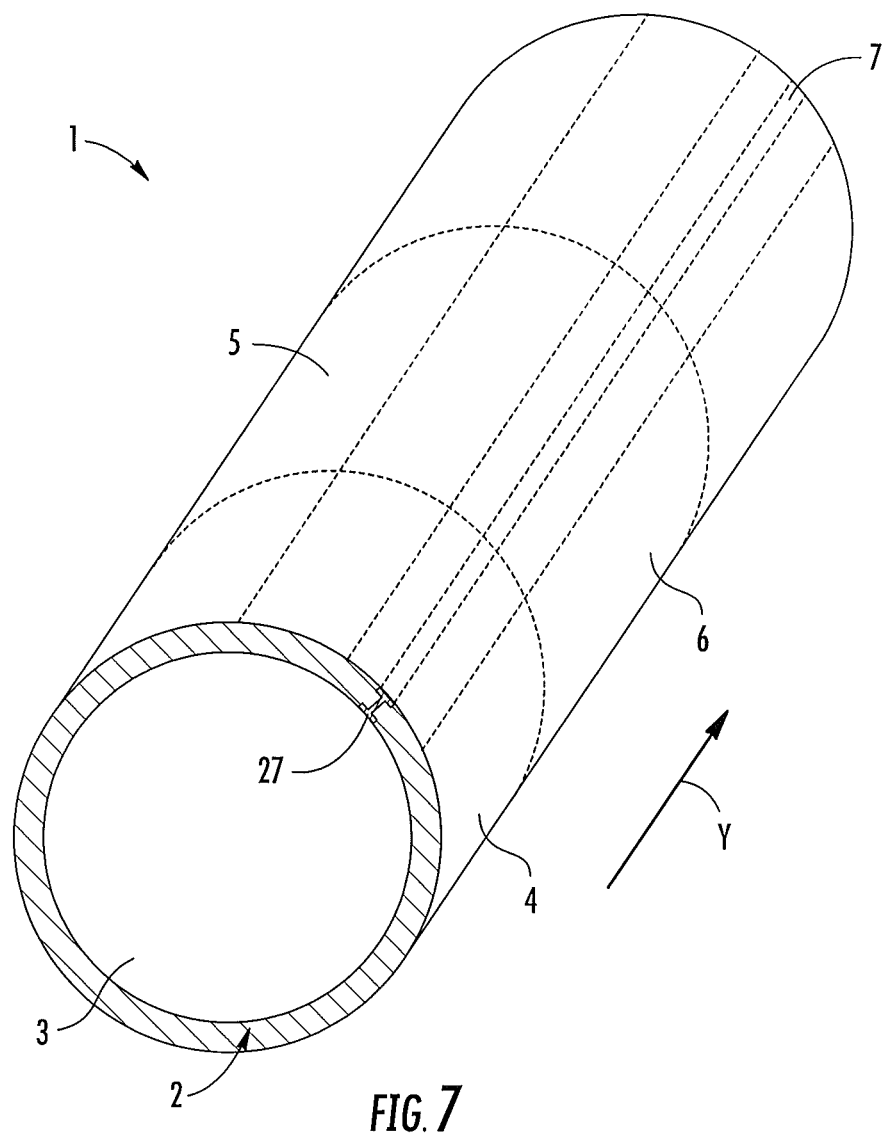
FIG. 7 is a perspective view of a further preferred embodiment of the structural element.

FIG. 7 illustrates a further preferred embodiment of a structural element 1. The structural element 1 is configured, for example, as a so-called foam sandwich fuselage 1 for a fuselage airframe of an aircraft, as the fuselage structure 1 of a rail vehicle or as a rocket stage 1. The core 2 which is preferably surrounded by the cover layer 3 according to the embodiments of the structural element 1 according to FIG. 1 to 4 is segmented in any desired manner and formed using any core materials and it has the integrated reinforcement 27 for varying portions of the rigidity of the core 2. FIG. 7 illustrates by way of example a reinforcement profiled part 27 which extends in the longitudinal direction y of the structural element 1. The core segments are shown in dashed lines in FIG. 7. By way of example, only segments 4-7 have been provided with reference numerals.

Figure 8:
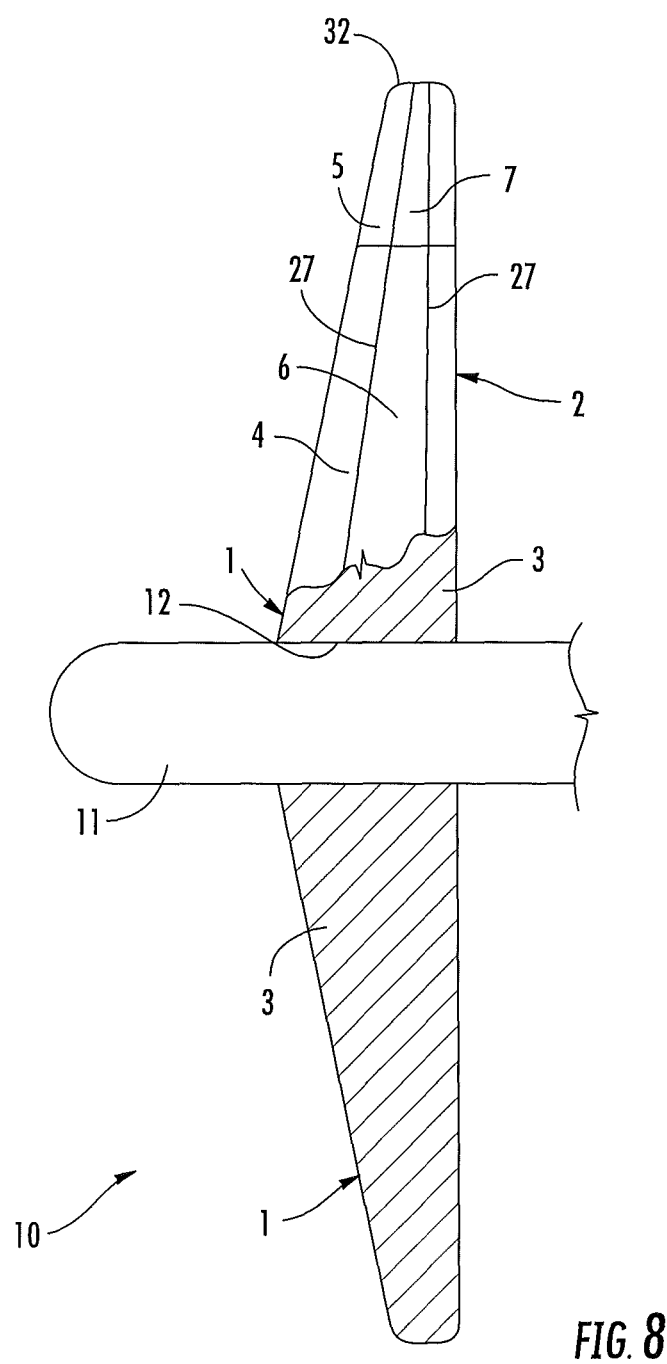
FIG. 8 is an example of a case of use of the structural element.

FIG. 8 illustrates an example of a case of use of the structural element 1 according to FIG. 1 to 7. The structural element 1 is configured, for example, as an aerofoil 1 of an aircraft and spacecraft 10. Two aerofoils 1 are joined to a fuselage airframe 11 of the aircraft and spacecraft 10. Only portions of the cover layer 3, show in hatched lines, of the structural element 1 are illustrated to provide a clearer view. The core 2 of the structural element 1 has, for example, core segments 4-7 and for example the core segments 5, 7 which are arranged on the tip 32 of the structural element configured as an aerofoil tip 32 have a higher, in particular a significantly higher volume weight than the core segments 4, 6 arranged on the structural element root 12 configured as an aerofoil root 12. The volume weight of the respective core segments preferably increases continuously from the aerofoil root 12 to the aerofoil tip 32. Furthermore, the core 2 has the integrated reinforcement 27 which is configured, for example, as two reinforcement profiled parts 27 which extend from the aerofoil root 12 to the aerofoil tip 32. The reinforcement profiled parts 27 are arranged, for example between the core segments 4-7.

The procedure for producing a structural element 1 of this type for an aircraft and spacecraft 10 is for example as follows. First of all, the structural element 1 is optimised for the respective case of use in respect of its component weight, rigidity and mechanical characteristics. The outer shape, the design of the structural element 1, is thus predetermined by the aerodynamic requirements. The aeroelastic characteristics of this structural element, for example the mode shape thereof, are then calculated, for example by means of simulation or are determined by a bench test, in particular a vibration test. Thereafter, the rigidity of the core 2 of the structural element 1 is varied at least in portions by means of the integrated reinforcement 27 such that the aeroelastic characteristics of the structural element 1 are improved or optimised. For example, the integrated reinforcement 27, in particular the position and path of the integrated reinforcement 27 in the core 2 influences the mode shape or eigenmode of the structural element 1. This is the shape which the structural element 1 assumes under an aerodynamic load, for example. As a result, the static serviceability of the structural element 1 is varied, in particular improved. A change in layer orientation and in layer structure of the cover layer 3 is not required for this purpose. A mould required for producing the structural element 1 does not have to be modified in a complex and cost-intensive manner. Furthermore, the material density of the core 2 of the structural element 1 can be varied at least in portions such that the natural vibration behaviour of the structural element 1 is optimised. The integrated reinforcement 27 can be introduced according to the static layout of the structural element 1, as a result of which it is possible to vary the rigidity of the core 2 without being at variance with the static layout of the structural element 1 in respect of the layer orientation or the laminate arrangement of the cover layer 3. The variation in rigidity of the core 2 produces an anisotropy, in particular a rigidity anisotropy of the structural element 1. As a result of this, the aeroelastic characteristics of the structural element 1 are optimised without changing the static strength or even the geometry of the structural element 1. The efficiency of the structural element 1 is basically to be seen in the influencing of the mode shape, i.e. the shape of the structural element 1 under a load.

The aeroelastic characteristics of the structural element 1 are manipulated by the variation in portions of the rigidity of the core 2, without varying the laminate structure, i.e. the number of laminate layers or the fibre orientation of the cover layer 3. In contrast to such a variation of the laminate structure, the manufacturability and the repairability of the structural element 1 is virtually not impaired due to the anisotropy of the structural element 1 which is produced by means of the variation in rigidity or the core 2. This anisotropic design of the structural element 1 means that said structural element 1 assumes a different mode shape under load than in the case of an isotropic design. In optimising the aeroelastic behaviour, the avoidance of fluttering of the structural element 1 and the static divergence of the structural element 1 is of paramount importance.

A fluttering phenomenon occurs, for example, when two mode shapes of a component coincide, in particular a flexural mode and a torsional mode with the same or similar natural frequencies. As a result, these two modes are superimposed and in the worst case, the component ruptures. By means of the structural element 1 according to the invention, a corresponding variation in portions of the rigidity of the core 2, for example, changes the flexural mode shape of the structural element 1 at a specific frequency and moves it away, for example from the torsional mode shape. In this respect, even changing the natural frequency of 0, 1 Hz can produce fluttering or no fluttering.

The term "static divergence" is understood as meaning the deformation of the structural element 1, for example under an aerodynamic load due to aeroelastic interactions between the structural element 1 and the air flow acting on said structural element. In this respect, the structural element 1 avoids the load and is bent and twisted, it being possible for this deformation of the structural element 1 to lead to the disintegration of said structural element. Furthermore, due to the optimisation of the aeroelastic characteristics of the structural element 1 for example, the mode shape of the structural element 1 is changed under load such that it assumes a mode shape in which the aerodynamic loads on the structural element 1 do not exert a self-reinforcing effect. As explained above, for instance in the specific example of use of an aircraft aerofoil as the structural element 1, this means that for example the leading edge 8 of the aerofoil should be twisted downwards and not upwards under air load by an appropriate arrangement of the integrated reinforcement 27. If the leading edge 8 turns up, the air would flow along the lower side of the aerofoil and would turn the leading edge 8 up further, in other words a self-reinforcing effect would occur which could ultimately result in the disintegration of the aerofoil from the aircraft and spacecraft.

Although the present invention has been fully described based on preferred embodiments, it is not restricted thereto, but can be modified in many different ways. In particular, features of the individual embodiments stated above can be combined together in any desired manner, if this makes technical sense.

For example, the structural element is configured as a tail unit surface, as a control surface or as a fuselage segment of an aircraft or spacecraft.

The stated materials, quoted numbers and dimensions are to be understood as examples and serve merely to illustrate the embodiments and developments of the present invention.

Of course, it is also conceivable to use the invention in other fields, particularly in vehicle construction or shipbuilding.

What is claimed is:

1. A structural element, in particular for an aircraft and spacecraft, comprising a core, the rigidity of which varies at least in portions for optimising the aeroelastic characteristics of the structural element, wherein the core has an integrated reinforcement for varying the rigidity in portions and wherein the reinforcement runs at an angle to a longitudinal direction of the structural element.

2. The structural element according to claim 1, wherein the structural element has a sandwich structure with a cover layer which surrounds the core at least in portions, in particular a cover layer which is formed from carbon fibres.

3. The structural element according to claim 1, wherein the integrated reinforcement couples together mutually opposing cover skins of the cover layer of the structural element.

4. The structural element according to claim 1, wherein the integrated reinforcement and the cover layer are configured monolithically.

5. The structural element according to claim 1, wherein the integrated reinforcement comprises a reinforcement pin.

6. The structural element according to claim 5 wherein the reinforcement pin is arranged at an inclination angle and in an inclination direction to a least one of the cover skins.

7. The structural element according to claim 6, wherein the integrated reinforcement has a large number of reinforcement pins which have in particular differing inclination angles and/or differing inclination directions.

8. The structural element according to claim 1, wherein the integrated reinforcement has a reinforcement profiled part.

9. The structural element according to claim 8, wherein the reinforcement profiled part is configured as double T-profiled part, a T-profiled part, an I-profiled part, a C-profiled part, a Z-profiled part, a round profiled part, a box profiled part or the like.

10. The structural element according to claim 1, wherein a material density of the core varies at least in portions to optimise the natural vibration behaviour of the structural element, the core having in particular core segments of a differing material density.

11. An aircraft and spacecraft comprising a structural element according to claim 1.

12. A rotor blade for a wind turbine, comprising a structural element according to claim 1.

13. A method for producing a structural element, in particular for an aircraft and spacecraft, comprising:
   provision of a structural element comprising a core;
   determination of the aeroelastic behaviour of the structural element; and
   variation, at least in portions, of the rigidity of the core of the structural element such that the aeroelastic behaviour of the structural element is optimised.

14. The method according to claim 13, wherein the aeroelastic behaviour of the structural element is determined by simulation or by a vibration test.

* * * * *